US012616622B2

(12) United States Patent
Kamada et al.

(10) Patent No.: US 12,616,622 B2
(45) Date of Patent: May 5, 2026

(54) DEVICE TO FACILITATE THE TRANSPORT OR STORAGE OF ITEMS BY A PERSON SEATED IN A WHEELCHAIR OR USING OTHER MOBILE DEVICES

(71) Applicant: includesign LLC, Providence, RI (US)

(72) Inventors: Diana Perkins Kamada, Newton, MA (US); Chloe Anna Joelle Rosenberg, Aquinnah, MA (US); Hannah Stewart Mintz, Providence, RI (US)

(73) Assignee: Includesign, Providence, RI (US)

( * ) Notice: Subject to any disclaimer, the term of this patent is extended or adjusted under 35 U.S.C. 154(b) by 515 days.

(21) Appl. No.: 17/307,498

(22) Filed: May 4, 2021

(65) Prior Publication Data

US 2022/0031540 A1 Feb. 3, 2022

Related U.S. Application Data

(60) Provisional application No. 63/060,191, filed on Aug. 3, 2020.

(51) Int. Cl.
*A61G 5/10* (2006.01)

(52) U.S. Cl.
CPC .................................. *A61G 5/1094* (2016.11)

(58) Field of Classification Search
CPC ........ B62J 9/27; A61H 2003/002; A61G 5/10; A61G 5/1094; B65D 37/00
USPC ....... 224/407, 572, 432, 438, 664, 409, 430, 224/434; 280/304.1; 220/9.4; 297/188.06, DIG. 4, 188.2
See application file for complete search history.

(56) References Cited

U.S. PATENT DOCUMENTS

| | | | | |
|---|---|---|---|---|
| 5,288,001 A * | 2/1994 | Locarno | A61G 5/1054 | 224/567 |
| 6,401,996 B1 * | 6/2002 | Thom | B65D 11/1873 | 224/407 |
| 7,635,064 B2 * | 12/2009 | Wang | B65D 37/00 | 220/9.4 |
| 2005/0121481 A1 * | 6/2005 | Chiu | A61H 3/00 | 224/407 |
| 2009/0078709 A1 * | 3/2009 | Murrer, III | G21F 9/36 | 220/592.2 |
| 2015/0122810 A1 * | 5/2015 | Yang | A45C 3/00 | 220/9.4 |
| 2016/0121803 A1 * | 5/2016 | Masanek, Jr. | B65D 11/22 | 220/4.28 |
| 2018/0255978 A1 * | 9/2018 | Ploski | A47K 3/064 | |

* cited by examiner

*Primary Examiner* — Corey N Skurdal
(74) *Attorney, Agent, or Firm* — FEENEY IP LAW; Alan F. Feeney; Logan Faucher

(57) ABSTRACT

A collapsible device designed to assist individuals to securely store and transport items while using, for example, a wheelchair. The design allows the user, in some instances, to transport and store items, such as groceries, quickly and effortlessly while seated in the wheelchair.

12 Claims, 6 Drawing Sheets

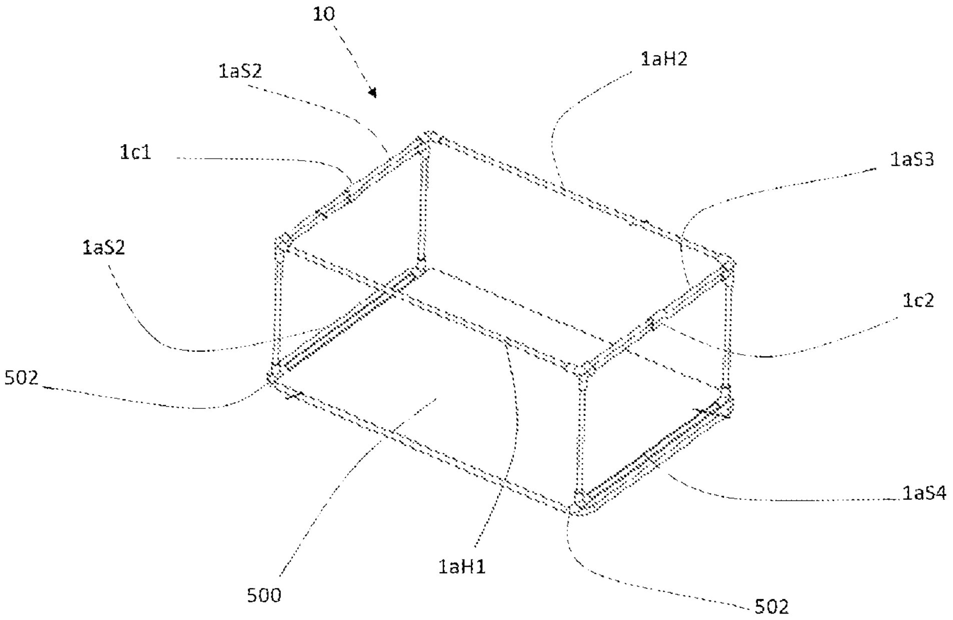
FIG. 4A
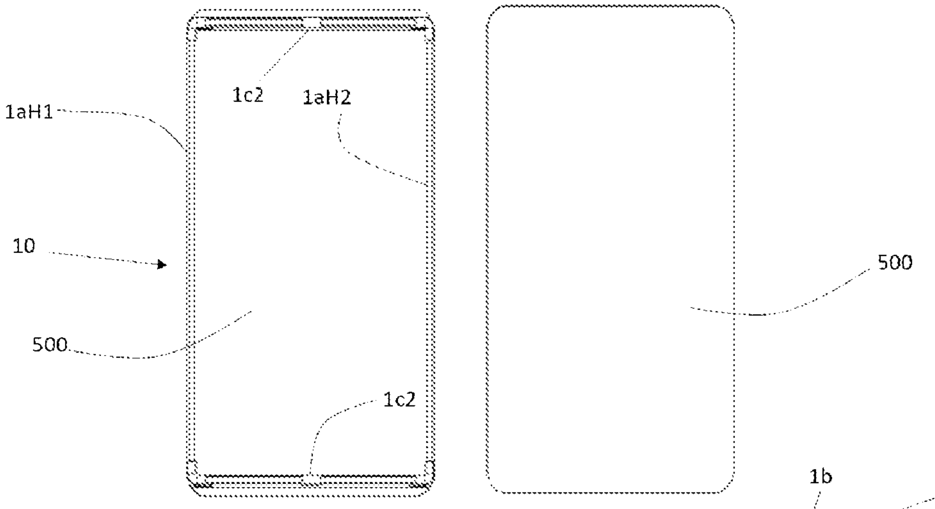
FIG. 4B
FIG. 4C
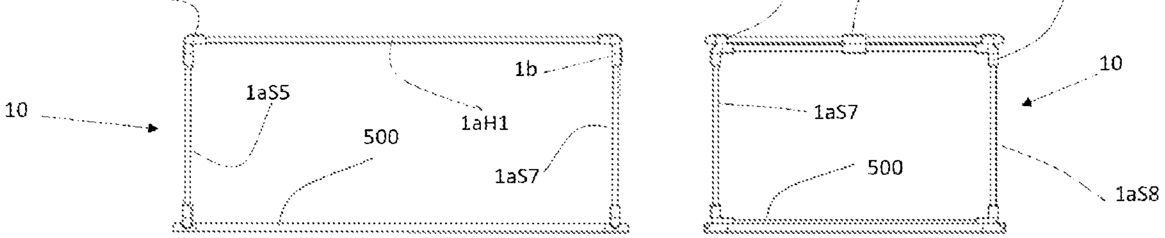
FIG. 4D
FIG. 4E

DEVICE TO FACILITATE THE TRANSPORT OR STORAGE OF ITEMS BY A PERSON SEATED IN A WHEELCHAIR OR USING OTHER MOBILE DEVICES

CROSS-SECTION TO RELATED APPLICATION(S)

This application claims the benefit of priority of U.S. Provisional Patent Application No. 63/060,191, filed on Aug. 3, 2020, the contents of which are incorporated by reference herein.

FIELD OF THE DISCLOSURE

The present disclosure relates to devices to facilitate the transport or storage of items by a person seated in a wheelchair or using other mobile devices.

BACKGROUND OF THE DISCLOSURE

Disabilities continue to be common both in the United States and throughout the world. For example, millions of people who are unable to walk as a result of illness, injury or disability use a wheelchair full-time or part-time as a means of transport. Although many more people need a wheelchair, only a small percentage of them have access to one. These individuals must accomplish everyday tasks, often while using a wheelchair, and for those individuals without personal aids, these tasks can be extremely difficult. Among the necessary, but particularly difficult, tasks for wheelchair users is shopping.

Shopping for groceries is one essential task that burdens all individuals, but some more than others. Although there are current shopping services, such as home delivery and personal aids, these services can become fairly expensive, and for individuals who wish to partake in the shopping experience, they are less than optimal. In view of these and other challenges, the Americans with Disabilities Act Accessibility Guidelines (ADAAG), for example, provide guidelines for stores on how to make their isles and checkout lanes more accessible.

Although the ADAAG helped make grocery stores more accessible, there are still limited options available for people in wheelchairs when it comes to holding their groceries. Some current options include adaptive shopping carts and motorized shopping carts. Adaptive shopping carts are shopping carts that can be used by an individual in a manual or automatic wheelchair. These adaptive shopping carts are designed to be roughly the proper height and size to be pushed by the wheelchair user, however, these carts extend roughly two feet in front of the wheelchair, which adds to the already difficult task of maneuvering through the aisles. Motorized shopping carts, which are automatic shopping carts where a basket is often attached to the front of the cart, are available in some countries. These carts are also longer than the traditional wheelchair, which adds to the difficulty of maneuvering through the aisles. In addition, such motorized shopping carts typically are owned by someone other than the user. Therefore, the user must relocate herself into and out of the motorized shopping cart, which can be extremely difficult for people with less upper body strength and/or control over their motor functions. Additionally, in order to use these carts, a wheelchair user must leave her personal chair unattended while she shops.

BRIEF SUMMARY

The present disclosure describes, among other things, a device including a basket that allows a wheelchair user to quickly and effortlessly transport purchased goods including, but not limited to, groceries while remaining in his or her wheelchair. Means to secure the apparatus to a person, or to a chair in which the person is seated, can be included as well. Unlike traditional shopping baskets, the device can help prevent items from falling out of the basket when the user either releases both hands to propel a wheelchair or stops abruptly in a wheelchair. In addition, in some instances, the device can provide an improvement over adaptive shopping carts and motorized shopping carts by avoiding both the added difficulty of maneuvering a basket extension or a large motorized wheelchair through the shopping aisles of a grocery store or when attempting to relocate into and out of a secondary wheelchair. This device can be used, for example, in any industry where items must be held or transported by the wheelchair user. This basket can also be used by a wheelchair user in any employment role when the employee needs to carry or transport items.

In one aspect, the device includes a collapsible basket that can rest, for example, on the wheelchair user's lap and can be fastened, for example, around the user's waist to secure the basket and prevent it from falling. This design allows the user to quickly and effortlessly transport various items, including groceries, while remaining in her own, personal wheelchair. By fastening the basket to the user's lap, the items are less likely to fall out of the basket when the user either releases both hands to propel the wheelchair or stops abruptly in the wheelchair. Additionally, the device can be used to transport groceries or other purchased goods, for example, from the store to the user's car and from the user's car to her home. The device also can, in some cases, be beneficial to the stores as the device may be less costly than either motorized or adaptive shopping carts, and need not require charging stations. The user also no longer needs to be dependent upon retailers to have motorized or adaptive shopping carts, and instead can transport purchased goods on her own.

In accordance with some implementations, the disclosure describes an apparatus that includes one or more structural members that provide a collapsible frame. An external cover contains the collapsible frame so as to define a container-like structure having an inner space. The apparatus also includes means to secure the apparatus to a person or to a chair in which the person is seated.

In accordance with some implementations, the disclosure describes an apparatus that includes a collapsible frame including an open wall. The collapsible frame also includes first and second sides, each of which is attached to a respective end of the open wall. Each of the sides is operable to be swiveled partially about the respective one of the sides of the open wall so that the collapsible frame can be placed in a folded or unfolded state. An external cover is on the collapsible frame so as to provide a container-like structure having an inner space. A strap (e.g., a belt) is provided to secure the apparatus, for example, to a person or to a chair in which the person is seated.

Although the particular examples below are described in connection with use of the device by a wheelchair user, the device also may be beneficial to persons using other mobile devices, such as strollers, bikes, electric scooters or baby carriages.

Other aspects, features and advantages will be readily apparent from the following detailed description, the accompanying drawings, and the claims.

BRIEF DESCRIPTION OF THE DRAWINGS

The following detailed description of the invention reference is made to the accompanying drawings and which are shown, by way of illustration, specific embodiments in which the invention may be practiced. Other embodiments may be utilized, and structural or other changes may be made, without departing from the scope of the present invention.

FIG. 3A shows a perspective from the top and to the side. FIG. 3B is from a perspective looking down directly into the opening of the internal structure while it is collapsed. FIG. 3C is from a perspective looking down directly at the bottom of the internal structure while it is collapsed. FIG. 3D is from a perspective looking at a first side of the internal structure while it is collapsed. FIG. 3E is from a perspective looking at a second side of the internal structure while it is collapsed.

FIGS. 4A-4E depict three-dimensional views of the first internal structure when it is in its un-collapsed state. FIG. 4A is from a perspective from the top and to the side. FIG. 4B is from a perspective looking down directly into the opening of the internal structure in the un-collapsed state. FIG. 4C is from a perspective looking down directly at the bottom of the internal structure in the un-collapsed state. FIG. 4D is from a perspective looking at the first side of the internal structure in the un-collapsed state. FIG. 4E is from a perspective looking at the second side of the internal structure in the un-collapsed state.

DETAILED DESCRIPTION

Figure 1:
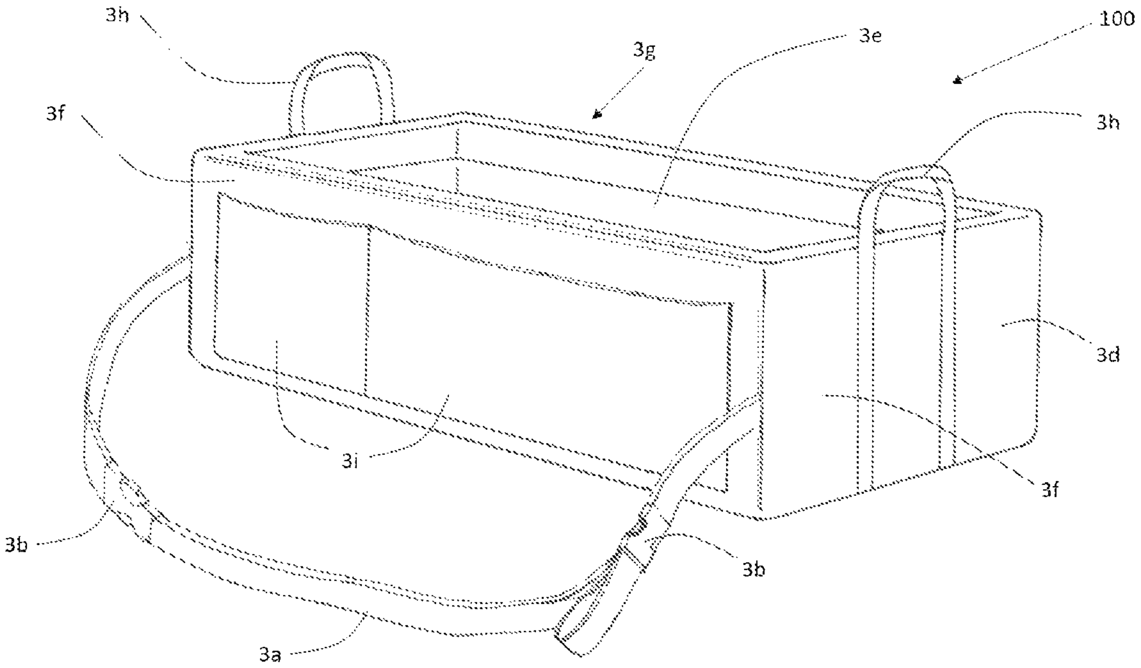
FIG. 1 shows an example of a basket having an internal collapsible structure and an external cover.
Figure 2:
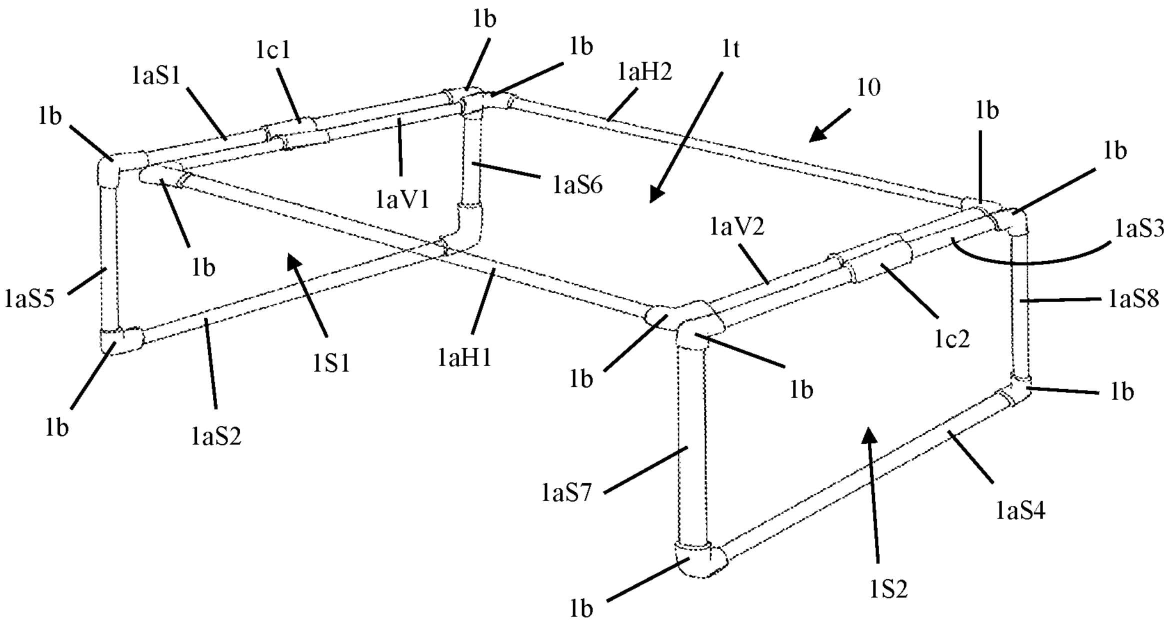
FIG. 2 shows a first example of the internal collapsible structure.
Figure 5:
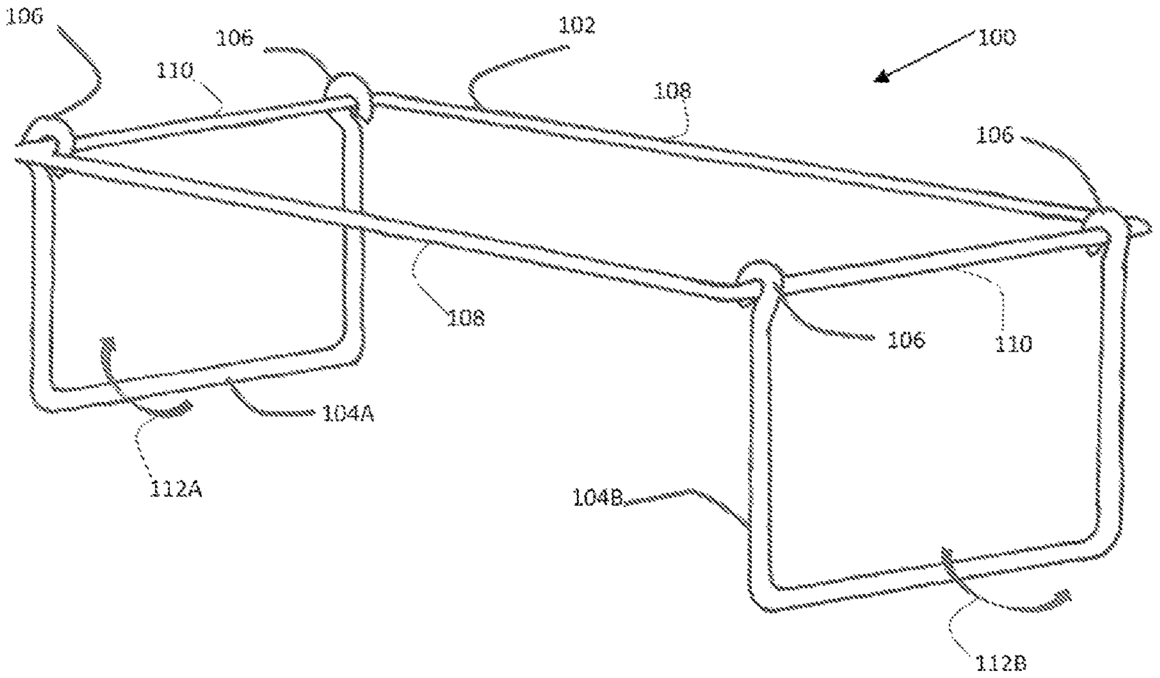
FIGS. 5 and 6 show a second example of the internal collapsible structure.

As illustrated in FIG. 1, a device comprises a basket that includes an internal collapsible structure and an external cover 3*d*. The basket can be any container used to hold or carry objects consistent with the present disclosure. FIG. 2 illustrates a first example of the internal collapsible structure 10, and FIG. 5 illustrates a second example of the internal collapsible structure 100. As the internal structure is collapsible, it allows the device to be folded into a relatively small space.

Internal Collapsible Structure—First Implementation

As shown in the example of FIG. 2, the internal collapsible structure 10 includes pipes 1*a*S1 through 1*a*S8, 1*a*H1 and 1*a*H2, and 1*a*V1 and 1*a*V2 (individually or collectively, pipe(s) or pole(s) 1*a*) that are interlocked by respective angled connectors (also referred to as "elbow connectors") 1*b* and connectors comprised of two aligned and conjoined connectors (also referred to as "parallel connectors") 1*c*1 and 1*c*2 (individually or collectively, connector(s) 1*c*). The pipes 1*a*, can be implemented, for example, as elongated, tubular structures (e.g., hollow pipes or solid rods). In some cases, the pipes 1*a* are "telescoping" pipes that have the ability to slide partially into themselves, so that the pipes becomes shorter. The parallel connectors 1*c* are capable of engaging and retaining two pipes 1*a* situated therein. Individually or collectively, one or more of the pipes 1*a*, the elbow connectors 1*b* and/or the parallel connectors 1*c* may be referred to as structural member(s).

The collapsible internal structure 10 is surrounded by the external cover 3*d*, which defines an inner space 3*e* created by upward extending walls 3*f*, an open end 3*g* of the inner space and a base. In some implementations, the external cover includes one or more pockets 3*i*, and handles 3*h* for carrying the basket. As further shown in FIG. 1, the external cover can include means to secure the apparatus to a person or to a chair in which the person is seated. In some implementations, for example, the external cover includes a belt or other strap 3*a* to wrap around the waist of a user or across the user's chest, side release buckles 3*b* to secure the belt 3*a* around a user's waist, across the user's chest or the chair, and, in some instances, a second pocket to hold additional items the user may need during shopping (e.g., a phone, wallet, or a reacher, which can be used as a tool used to extend the user's reach to higher shelves or items on the floor). In some instances, the belt or other strap 3*a* is configured to be secured to a chair in which the user is seated. In some instances, the belt (or other strap) 3*a* is composed of a strip of leather. The external cover 3*d* can include sleeves located in the internal compartment that houses the pipes 1*a* and connects the internal collapsible structure 10 to the external cover 3*d*.

In some implementations, as shown in FIG. 2, the internal collapsible structure 10 has a rigid frame having an open top rectangular wall 1*t* and two vertical side walls 1*s*1 and 1*s*2, but no bottom or horizontal side walls. The open top wall 1*t* can be created by joining two horizontally orientated pipes 1*a*H1 and 1*a*H2 to two vertically orientated pipes 1*a*V1 and 1*a*V2 using four of elbow connectors 1*b* In the illustrated embodiment of FIG. 2, the two horizontally orientated pipes 1*a*H1 and 1*a*H2 are longer in length than the two vertically orientated pipes 1*a*V1 and 1*a*V2. The two vertically-orientated side walls 1*s*1 and 1*s*2 can be created by joining two top horizontally orientated pipes 1*a*S1 to 1*a*S2 and 1*a*S3 to 1*a*S4 using two bottom vertically orientated pipes 1*a*, i.e. using pipes 1*a*S5 and 1*a*S6 to join pipes 1*a*S1 and 1*a*S2 and pipes 1*a*S7 and 1*a*S8 to join pipes 1*a*S3 to 1*a*S4 using elbow connectors 1*b*. The vertical pipes 1*a*V1 and 1*a*V2 of the top wall 1*t* are attached to the top horizontal pipes 1*a*S1 and 1*a*S3 of the two side walls 1S1 and 1S2 using one or more of the parallel connectors 1*c*1 and 1*c*2.

Figure 3A:
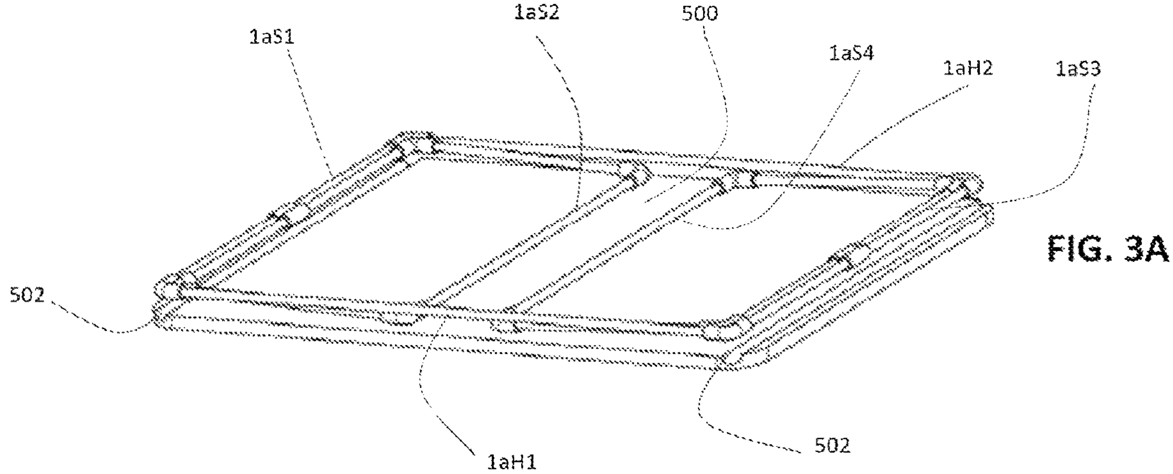
FIGS. 3A-3E depict three-dimensional views of the first internal structure when it is in its collapsed state.
Figure 3B:
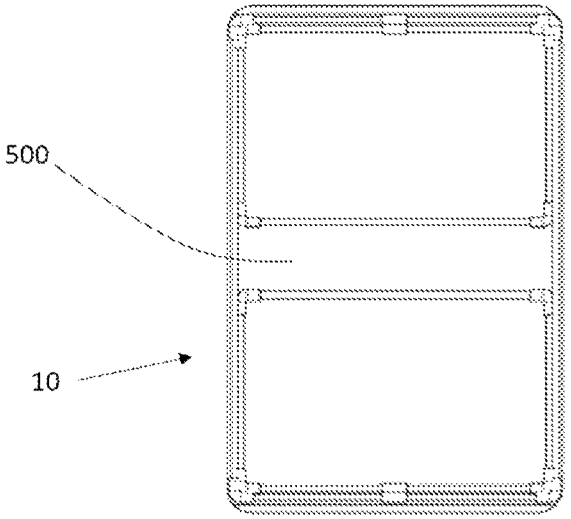
Figure 3C:
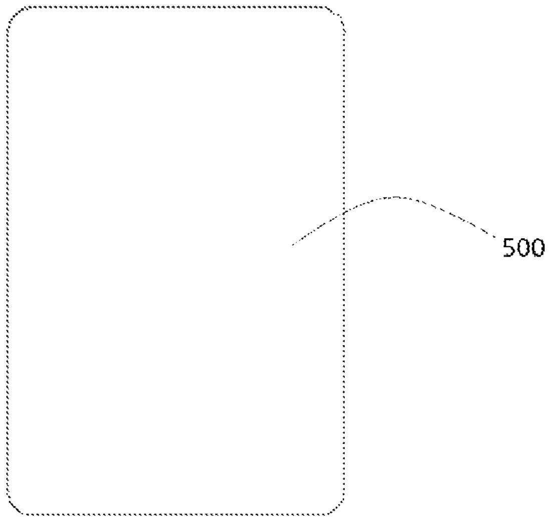
Figure 3D:
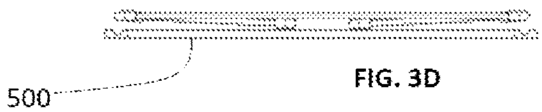
Figure 3E:
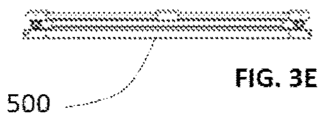

In some implementations (see FIG. 4A), the device also includes a rigid bottom wall or base 500 to support the internal collapsible structure 10. In some cases, the collapsible structure 10 can be attached to the base 500. The base 500 can have about the same area as the open top wall 1*t* of the collapsible structure. The base 500 can further comprise means 502 in which to secure the pipes 1*a*S2, 1*a*S4 when the collapsible structure in in the uncollapsed or unfolded state (FIG. 4A) or to secure the pipes 1*a*S1, 1*a*S3 of the open top 1*t* when the device is collapsed (FIG. 3A). For example, in some instances, the base 500 has recesses 502 that extend along the surface of the base at opposite sides of the base. The diameter of these recesses preferably should be slightly greater than the diameter of the pipes 1*a*S2, 1*a*S4 and 1*a*S1, 1*a*S3. When a user attempts to collapse the device for storage by applying a downward force on the two sides 1S1 and 1S2 of the collapsible structure 10, the pipes 1*a*S1 and 1*a*S3 are pushed downward until both engage and, in some cases snap-into, the recesses 502 and are held therein, for example, with a press fit and/or friction fit. The press fit preferably should, however, be tight enough to hold the pipes 1*a*S2, 1*a*S4 or 1*a*S1, 1*a*S3, but not so tight that the pipes 1*a*S2, 1*a*S4 or 1*a*S1, 1*a*S3 cannot be dislodged relatively easily from the recesses 502 when necessary for a user to change the internal structure 10 from its collapsed state to its un-collapsed state, or vice-versa.

The basket represents, in some implementations, an improvement over other storage and carrying options available to wheelchair users who shop at traditional brick-and-mortar stores, because the basket is secured to the user's lap, thus helping prevent items placed in the claimed basket from falling out of the basket when the user either releases both hands to propel a manual wheelchair or stops abruptly in an automatic wheelchair. In addition, the basket can provide an improvement over adaptive shopping carts and motorized shopping carts that are difficult to maneuver due to the unwieldy basket extension or due to the large size of motorized wheelchairs that are difficult to move about store aisles, particularly for users with limited coordination. In addition, the device can, in some cases, remove the need of a user to relocate into and out of a secondary wheelchair which can be difficult and may result in injury to the user, particularly for users with limited upper body strength.

The basket can serve as a secure collapsible carrying device for wheelchair users for use in any industry where items are to be held or transported by the wheelchair user, including but not limited to, the healthcare industry, education industry, retail industry, business industry, legal industry, law enforcement, political industry, hospitality industry, sports (par-athletics) and/or combinations thereof. The basket also can serve as a secure collapsible carrying device for personal activities (e.g., laundry, household chores, or gardening).

The pipes 1*a* and parallel connectors 1*c* of the basket may be made using various manufacturing techniques including, but not limited to, processes of extrusion, machining, 3D printing, injection molding, vacuum forming, stamping, forging, casting, hand sewing, machine sewing, die cutting, laser cutting, water jetting, compression molding, powdered metal, hand crafting, molding, sand casting or any other form of additive or subtractive manufacturing. The processes used to make the basket may depend, among other factors, on the type of materials used for each component.

The elbow connectors 1*b* of the internal collapsible structure 10 may be formed, for example, using a manufacturing process selected from a group consisting of extrusion, machining, 3D printing, injection molding, vacuum forming, stamping, forging, casting, die cutting, laser cutting, water jetting, compression molding, powdered metal, hand crafting, molding, sand casting or any other form of additive or subtractive manufacturing or combinations thereof. In some instances, the elbow connectors 1*b* may be formed other techniques (e.g., 3D printing).

In some implementations, all but one of the pipes 1*a* are manufactured from metal and the remaining pipe and connectors 1*b* and 1*c* are manufactured from polymers. The selected materials may differ in some instances based, for example, on the desired properties of the basket. For instance, in an alternative embodiment, if the user desires something geared more toward high performance, carbon fiber may be preferred.

In some implementations, the pipes 1*a* are tubes with an outer diameter equal to the internal diameter of the connectors 1*b* and 1*c*. The shape and diameter of the pipes 1*a* may differ based on the desired shape and size of the basket. For instance, in some embodiments, if the user desires a thicker and more durable basket, the pipes 1*a* may be manufactured having a larger diameter or employing a stronger material.

In some implementations, the connectors 1*b* and 1*c* have a curved L-shape structure similar to an elbow pipe. The shape of the connectors 1*b* and 1*c* may differ, for example, based on the desired design of the basket. For instance, if the user desires a basket with a triangular or oval shape, the angle of the elbow connector 1*b* would have to be greater than or less than a right angle depending on the desired shape.

In some implementations, the connectors 1*b* and 1*c* are circular with an internal diameter equal to the external diameter of the pipes 1*a*. The internal shape and diameter of the connector 1*b* and 1*c* may differ, for example, based on the shape and diameter of the external surface of the pipes that a connector joins.

In some implementations, the parallel connectors 1*c* and elbow connectors 1*b* are manufactured using one or more polymers. The selected polymer can be based on the desired properties of the basket. For instance, if the user desires a claimed basket that is more durable, metals, nonmetals, or metalloids, may be used.

The pipes 1*a* and connectors 1*b* and 1*c* may be made, for example, using a commonly-known manufacturing process that uses polymers or other materials including, but not limited to, extrusion, machining, 3D printing, injection molding, vacuum forming, stamping, forging, casting, die cutting, laser cutting, water jetting, compression molding, powdered metal, hand crafting, molding, sand casting or any other form of additive or subtractive manufacturing and combinations thereof. The technique used to make the frame may vary depending on the type of material used to make the frame as well as the desired quality and cost of the final product.

The internal collapsible structure 10 shown in FIG. 2 is a U-shaped, box-like structure (e.g., resembling a box in rectangularity) formed by attaching the pipes 1*a* to each other using the connectors 1*b* and 1*c*. A vertical pipe 1*a* is connected to a horizontal pipe 1*a* using an elbow connector 1*b* until a rectangular-shaped (or any other possible desired shape) wall is created. This technique is repeated until a first and a second side wall 1*d* and a bottom wall 1*e* are created. Using the parallel connectors 1*c*, one of the horizontal pipes 1*a* of the first the newly created side wall 1*d* is attached to one of the vertical pipes 1*a* of the bottom wall 1*e* while one of the horizontal pipes 1*a* of the second newly created side wall 1*d* is attached to the opposing vertical pipe 1*a* of the bottom wall 1*e* the U-shaped, box-like internal collapsible structure 10 is formed.

The parallel connectors 1*c* are integral to the internal structure being collapsible. The parallel connectors 1*c* are designed having a w-like shape, having an external curved recess (the recess that is further away from the inner space 3*e*) and an internal curved recess (the recess closest to the inner space 3*e*). Both recess are designed to accommodate a pipe 1*a* that forms internal collapsible structure 10. The pipe 1*a* situated in the internal curved recess is fixed, whereas the pipe 1*a* in the external curved recess is free to rotate. When the device is in its open state and the user desires to collapse the device for ease of storage, the user simply grabs onto the top pipes 1*a* located on the vertical sides of the device and exerts a downward force causing the pipes 1*a* situated in the external curved recesses of the parallel connectors 1*c* to rotate. The pipe 1*a* in the user's right hand can be designed to rotate clockwise, whereas the pipe 1*a* in the user's left hand can be designed to rotate counterclockwise. The rotation of the vertical pipes 1*a* closest to the user causes the vertical pipes 1*a* opposing the pipes 1*a* closest to the use to move inwards to the center of the inner space 3*e* causing the sides of the internal collapsible structure 10 to fold inward (or outward) until the vertical sides of the internal collapsible structure are substantially parallel to the vertical pipes 1*a* on which the user exerted a downward pressure.

FIGS. 3A through 3E illustrate an example of the device in its collapsed or folded state used, and FIGS. 4A through 4E illustrate the device in its uncollapsed or unfolded state. For better clarity in the drawings, the external cover is omitted in FIGS. 3A through 3E and FIGS. 4A through 4E. In the uncollapsed or unfolded state, the external cover 3*d* holds the collapsible internal frame 10 so as to define a container-like structure having an inner space into which a user may place items for storage and/or transport. In some instances, the external cover 3*d* may be attached or fixed to the internal frame 10.

Internal Collapsible Structure—Second Implementation

FIG. 5 illustrates an alternative, second implementation for the internal collapsible structure. As shown in the example of FIG. 5, the collapsible structure 100 includes a rigid frame having an open top rectangular wall 102. In the illustrated example, the frame of the open wall 102 includes two longer sides 108 and two shorter sides 110. In some instances, however, the sides 108, 110 may be substantially the same length as one another such that the open wall 102 is square. The frame of the open wall 102 can be formed, for example, as a single continuous piece, although in other implementations, the frame of the open wall 102 may be composed of multiple pieces that are connected together.

The frame of the collapsible structure 100 further includes two U-shaped sides 104A, 104B, each of which is attached at its respective ends 106 to a respective one of the sides 110 of the open wall 102. The ends 106 of the U-shaped sides 104A, 104B can be formed, for example, as hooks that allow each U-shaped side 104A, 104B to be swiveled or rotated partially about the respective one of the sides 110. Thus, in the un-collapsed (i.e., unfolded) state, as shown in FIG. 5, each U-shaped side 104A, 104B extends in the same direction substantially perpendicularly from the open wall 102. In some cases, the hooked ends 106 can be shaped such that the first U-shaped side 104A cannot rotate outwardly in the direction of the arrow 112A beyond the position shown in FIG. 5, and such that the second U-shaped side 104B cannot rotate outwardly in the direction of the arrow 112B beyond the position shown in FIG. 5.

The material of the collapsible frame 100 can be the same as or similar to those described above in connection with the pipes 1*a* of FIG. 2. Individually or collectively, one or more of the frame of the open wall 102 and/or the U-shaped sides 104A, 104B may be referred to as structural member(s).

The collapsible internal structure 100 can be surrounded by an external cover 3*d*, as explained above in connection with the collapsible internal structure 10 of FIG. 2, such that external cover defines an inner space 3*e* created by upward extending walls 3*f*, an open end 3*g* of the inner space and a base (see FIG. 1). Further details of the external cover in accordance with some implementations are described below.

Figure 6:
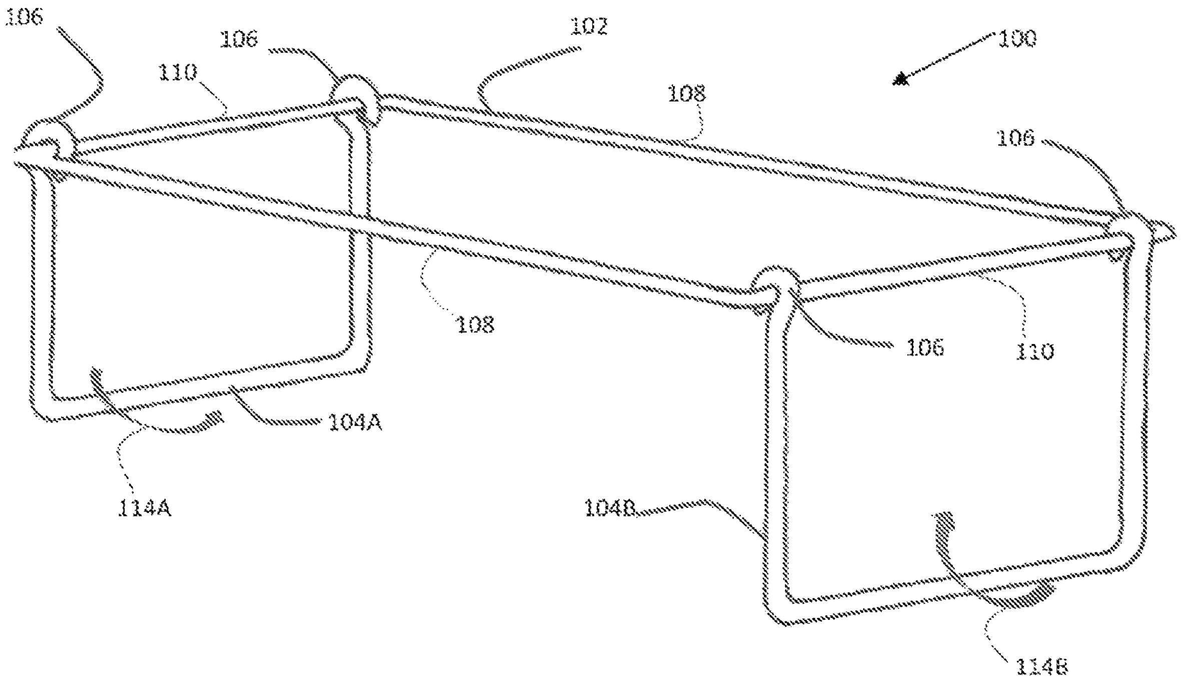

The two U-shaped sides 104A, 104B can be rotated, respectively, inwardly so as to collapse the frame 100. That is, as indicated by FIG. 6, the first side 104A can be rotated in the direction of the arrow 114A until the side 104A is substantially parallel to the open wall 102. Likewise, the second side 104B can be rotated in the direction of the arrow 114B until the side 104B is substantially parallel to the open wall 102. In this way, the frame 100 can be placed in a collapsed (i.e., folded) state, which can facilitate its storage, for example, in a compact manner.

Figure 7:
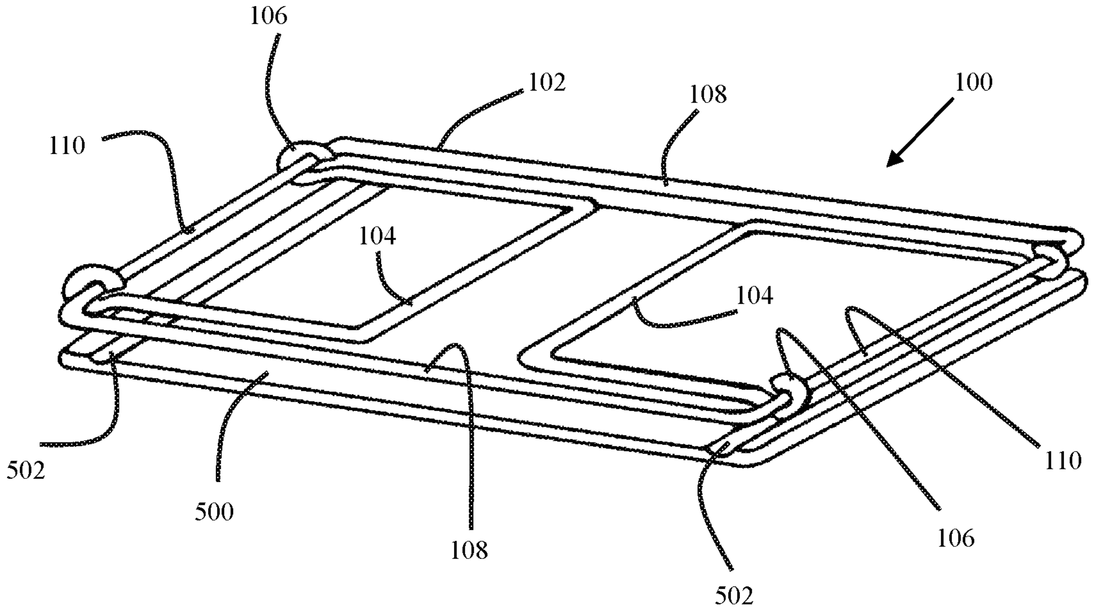
FIG. 7 depicts the second internal collapsible structure in a collapsed state.
Figure 8:
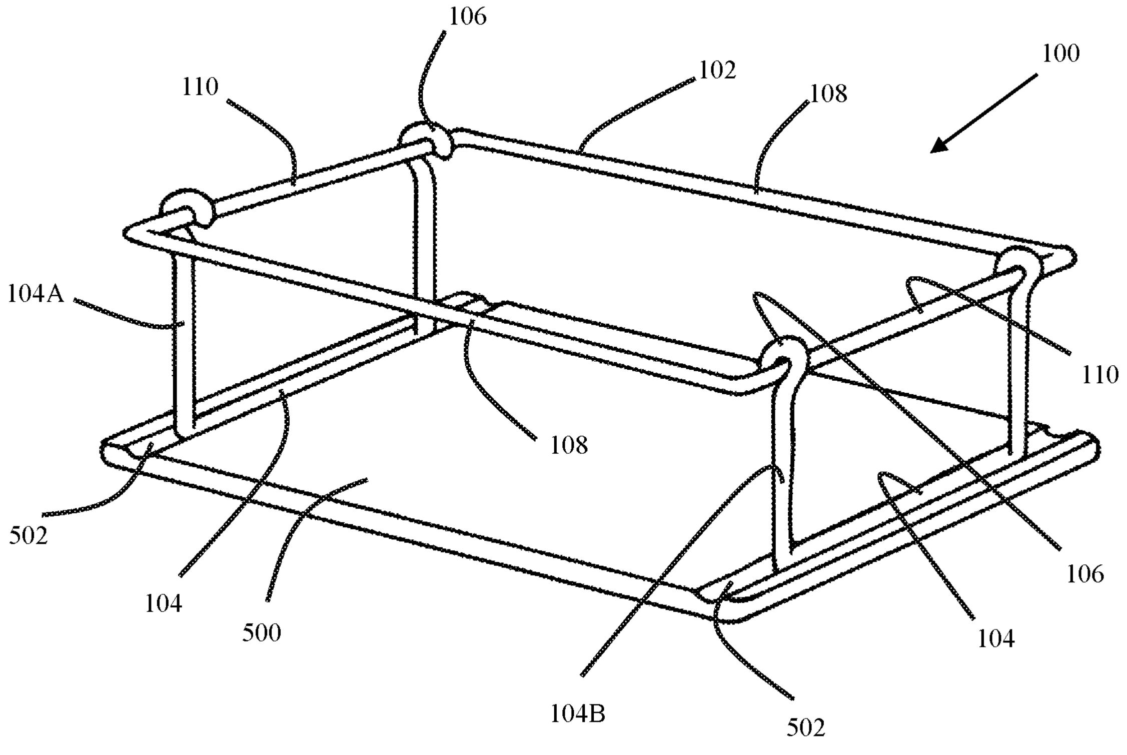
FIG. 8 depicts the second internal collapsible structure in an uncollapsed state.

FIG. 7 illustrates an example of the device 100 in its collapsed or folded state, and FIG. 8 illustrates the device 100 in its uncollapsed or unfolded state. For better clarity in the drawings, the external cover is omitted in FIGS. 7 and 8. In the uncollapsed or unfolded state, the external cover 3*d* holds the collapsible internal frame 10 so as to define a container-like structure having an inner space into which a user may place items for storage and/or transport. In some instances, the external cover 3*d* may be attached or fixed to the internal frame 10.

In some instances, the device can include a rigid bottom wall or base (see, e.g., 500 in FIGS. 7 and 8) to support the internal collapsible structure 100. The internal collapsible structure 100 can be supported or attached to the base in the same or similar manner as described above in connection with the first implementation of the internal collapsible structure 10. That is, the bottom wall or base 500 can support the internal collapsible structure 100. In some cases, the collapsible structure 100 can be attached to the base 500. The base 500 can have about the same area as the open top wall of the collapsible structure. The base 500 can further comprise means 502 in which to receive or secure the respective connecting portions 104 of the U-shaped sides 104A, 104B when the collapsible structure 100 in in the uncollapsed or unfolded state (see FIG. 8). For example, in some instances, the base 500 has recesses 502 that extend along the surface of the base at opposite sides of the base. The diameter of these recesses preferably should be slightly greater than the diameter of the connecting portions 104 of the U-shaped sides 104A, 104B, such that the connecting portions 104 can be pushed downward until they engage and, in some cases snap-into, the recesses 502 and are held therein, for example, with a press fit and/or friction fit. The press fit preferably should be tight enough to hold the connecting portions 104, but not so tight that the connecting portions 104 cannot be dislodged relatively easily from the recesses 502 when necessary for a user to change the internal structure 100, for example, from its un-collapsed state to its collapsed state.

External Cover

In some implementations, the external cover 3*d* is manufactured from fabric. The material from which the external cover 3*d* is manufactured may be different so as to provide a desired property of the basket. For instance, if the user prefers a more durable basket, in place of fabric, plastic, polymers, composites, or metal may be employed. In some embodiments, an insulated material may be used as the external cover 3*d*, instead of fabric, in order to maintain the temperature of cold or hot items put into the basket during grocery shopping. Insulation may be achieved using an insulated double layer of fabric, polymer or metal or any combinations thereof. The external cover 3*d* may have a single layer or may be comprised of multiple layers. An insulating material may be situated between the layers of the external cover 3*d*.

The external cover 3*d* may be attached to the internal collapsible structure of FIG. 2 or 6 using any attachment means known in the art. In some embodiments, for example, using the internal collapsible structure 10, the external cover 3*d* is "draped" over the pipes 1*a* that form the internal collapsible structure 10 and then unsecured ends of the external cover 3*d* are connected by stitching, stapling or gluing the unsecured ends. In some embodiments, the external cover 3*d* is attached directly to the internal collapsible structure 10 using known attachment means including, but not limited to acrylics, bio-adhesives, contact adhesive, cyanoacrylics, epoxy, glue, hot melt adhesives, iron-on adhesives, paste, polyester resins, polyols, polyurethane, pressure sensitive adhesive, staples, stitching, butterfly clutches, buttons, buckles, circle cotters, eyelets, grommets, hook-and-eye fasteners, hook-and-loop fasteners, lobster clasps, magnets, pins, rubber bands, snap fasteners, straps, twist ties, zippers. clamps, and/or any combination thereof. Likewise, the external cover 3*d* may be attached to the internal collapsible structure of FIG. 5 in accordance with any of the foregoing techniques.

The external cover 3*d* may be coated with a substance to make it waterproof In some implementations, the external cover 3*d* is made from a material that is stain resistant. In some implementations, the external cover 3*d* may be removed so that it may be cleaned, for example, using a washing machine.

In some implementations, as shown in FIG. 1, the external cover 3*d* includes two (or more) strap handles 3*h* on the walls 3*f* of the basket that are antiparallel to the walls housing the pocket(s) 3*i*. The handles 3*h*, in some embodiments, are polypropelene or woven nylon straps, although other materials may be used. The handles 3*h* can be attached to the sides of the external cover 3*d*, using a cross stich, although any other number of attachment means may be used, such as glue. In some cases, the handles 3*h* may be detachable using snaps or any other means. The length of each handle 3*h* may vary; however, the length should be sufficient to form a half-loop that is comfortable for the user after it is attached to the external cover 3*d*. The handles 3*h* may differ based on the user's preferred method of carrying the basket, including but not limited to, a single strap, multiple side handles, telescoping handles, or side slits. Some of these implementations may be particularly advantageous when the user desires to roll the basket requiring telescoping handles and optional wheels to allow the user to roll the basket.

In some implementations, the belt 3*a* is fastened about the user with a side release buckle 3*b*. As shown in FIG. 1, one or more side release buckles 3*b* are employed to connect the two ends of the belt 3*a*, although other types of buckles may be used. The ends of the belt 3*a* may be fastened using other devices including, but not limited to, clamps, buttons, snaps, magnets, hook and latch fasteners, or a hook and loop fasteners. Alternative fasteners may be preferred by users who have limited hand mobility, including, for example, those who are quadriplegic. The belt 3*a* may be made from a variety of materials including, but not limited to, nylon, woven nylon, leather, cloth, metal mesh, polypropylene, polyester, animal hide, silicone, rubber, elastic strapping, metal chains and combinations thereof. In some implementations, the belt 3*a* is made from woven nylon or polyester webbing. If polyester webbing is used, decorative elements, such as pictures, phrases, cartoons and the like, may be imprinted thereon. The buckle 3*b* (and/or buckle parts) may be secured to one or both ends of the belt 3*a*, for example, using box cross stitching. Other attachment means including, but not limited to acrylics, bio-adhesives, contact adhesive, cyanoacrylics, epoxy, glue, hot melt adhesives, iron-on adhesives, paste, polyester resins, polyols, polyurethane, pressure sensitive adhesive, staples, stitching, butterfly clutches, buttons, buckles, circle cotters, eyelets, grommets, hook-and-eye fasteners, hook-and-loop fasteners, lobster clasps, magnets, pins, rubber bands, snap fasteners, straps, twist ties, zippers and any combination thereof, may be used to secure the ends of the belt 3*a* to the buckle 3*b*. The belt 3*a* can be affixed to the basket by any number of means. In some implementations, the belt 3*a* is a continuous strip that is threaded between the layers of the external cover 3*d* and secured in place when the internal collapsible structure 10, 100 is placed within the external cover 3*d*.

In some implementations, a removable cover can be provided to enclose the opening to the inner space 3*e* after assembling the basket. Such a removable cover can include, for example, a flap that may be attached to the device using a zipper, hook and loop adhesive strips and/or snaps. The flap can, in some instances, be an extension of the external cover 3*d*, for example, at the top edge of one the upward extending walls 3*f* that completely covers the open end of an inner space 3*g*. The flap may be implemented in some cases as an extension of the external cover 3*d* that is folded over the inner space 3*g* and attached to the side of the device opposite to the fold. In some embodiments, the flap may be a separate covering that is not part of the external cover 3*d*. In such an embodiment, the separate flap may be attached to the external cover 3*d* using any appropriate attachment means such as, but not limited to, sewing or gluing. The flap also may be detachable using, for example, a zipper, or hook and loop strips. The flap does not have to be manufactured from the same material as the external cover 3*d*, although it may be. The flap also may be designed to include pockets, means in which to access the inner space 3*g*, handles, and any other features that would be desirable, for example, for a person using a wheelchair. In some implementations, the cover 3*d* may be non-removable. For example, in some instances, the frame can be attached (e.g., sewn) permanently to the cover 3*d*.

In some implementations of FIG. 1, the side 3*f* of the device that is configured to be positioned on the lap of a user (the "contact side") may further contain cushioning means. In some embodiments, the external cover 3*d* of the contact side may have an additional layer in which filler is inserted to create a "pillow-like" effect. Any material used to stuff a traditional pillow may be used including, but not limited to, polyester pellets, polyester microbeads, beanbag filler, foam pieces, down, feathers, wool, horse hair, natural shredded rubber, buckwheat, millet, hops, flax seed, lavender, silk fibers, hemp and raw cotton. Alternatively, the contact side may be designed to accommodate a memory pad or capable of being inflated or having a pouch in which an inflatable pillow is inserted. In some implementations, the device includes a separate cushion. The contact side can include means by which to attach the cushion to the basket, such as a hook-and-loop fastening strip or part of a snap fastener. Depending on the embodiment, the detachable cushion can be implemented as a complimentary hook-and-loop fastening strip or a complimentary part of a snap fastener.

The external cover 3*d* may be manufactured by any known processes to make coverings including, but not limited to, weaving, knitting, crocheting, knotting, tatting, felting, or braiding, spinning, bonding, embroidering, extrusion, machining, 3D printing, injection molding, vacuum forming, stamping, forging, casting, hand sewing, machine sewing, die cutting, laser cutting, water jetting, compression molding, powdered metal, hand crafting, molding, sand casting or any other form of additive or subtractive manufacturing, and combinations thereof. The technique used to make the external walls may vary depending on the type of material used to make the external walls as well as the desired quality and cost of the final product. The external cover 3*d* may be made from a single sheet of material, or a collection of sheets that are stitched together either before or after the external cover 3*d* is installed on the internal collapsible structure 10, 100.

Kits

Another aspect of the disclosure is directed to kits to allow a user to construct her own device. Such kits can include, for example, the following items to facilitate assembly of a device incorporating the first implementation of the internal collapsible structure (i.e., 10 as shown in FIG. 2):

a). at least twelve pipes 1*a;* b). at least twelve elbow connectors 1*b;* c). at least two parallel connectors 1*c;* d). an external cover 3*d* either as one unit or in several parts to be assembled by the user;

e). one or more detachable belts 3*a* to secure the device to the user when in use;

f). assembly instructions;

g). detachable handles 3*h* to attach to the basket so as to transport it to and from the user;

h). means in which to attach the external cover 3*d* to the internal collapsible structure 10 of FIG. 1 after assembly, such as, but not limited to, an adhesive, i.e. glue, hook and loop strips adhesive strips and/or snaps. Any adhesive means known in the art that can be easily stored and has a long shelf-life may be employed;

i). removeable dividers that may be used to create compartments within the inner space 3*e* after assembling the device;

j). means in which to insulate cold and/or hot items for extended periods of time. Such insulation means include, for example, containers that may be attached to the walls of the inner space 3*e* after assembling the device, insulation material that may be removably attached to the walls of the inner space 3*e* after assembling the device, or the like;

k). a removable cover to enclose the opening to the inner space 3*e* after assembling the basket including, but not limited to, a flap that may be attached to the device using a zipper, hook and loop adhesive strips and/or snaps;

l). one or more external pockets 3*i* to hold items such as, but not limited to a reacher, safety whistle, reflective tape and the like; and m). a permanent or removeable cushion or pillow (or pillow filling) that may either be inserted into the interior of the external cover 3*d* in embodiments in which the external cover 3*d* is manufactured having more than one layers that create an inner space or detachably affixed to the bottom of the device after assembly.

In some implementations, one or more of the foregoing items may be omitted from the kit. In some implementations, the kit may include addition or different items to allow a device as described in this disclosure to be assembled. For example, in some cases, a kit may include some or all of the items needed to facilitate assembly of a device incorporating the second implementation of the internal collapsible structure (i.e., 100 as shown in FIG. 5).

Various modifications will be apparent to those of ordinary skill in the art based on the present disclosure. Accordingly, other implementations are within the scope of the following claims.

What is claimed is:

1. An apparatus for use in personal wheelchairs comprising:

one or more structural members that provide a collapsible frame including an open wall and first and second sides, each of the sides being attached to a respective end of the open wall, wherein each of the first side and the second side comprises ends formed as hooks, each hook receiving a portion of the open wall therethrough to attach the first side and the second side to the open wall; an external cover containing the collapsible frame so as to define a container-like structure having an inner space, wherein the external cover attached to the collapsible frame defines an inner space comprising four upward extending walls, an open top and a bottom wall, and wherein a vertical edge of a first upward extending wall contacting a vertical edge of a second upward extending wall forms a corner;

means to secure the apparatus to a person who is seated, wherein the means to secure the apparatus to a person who is seated includes a belt, the belt comprising at least one of a side release buckle or a hook and loop fastener; wherein the belt is attached on a first end to a middle of a first corner, thereby extending along a length around a waist of a person, and wherein the belt is attached on a second end to a middle of a second corner:

wherein, in an unfolded state, a connecting portion of the first side and a connecting portion of the second side are each disposed within respective recesses formed into a base across an entire width of the base, each of the recesses having a diameter across the entire width of the base relative to a diameter of the connecting portions to releasably secure the connecting portions within the recesses, each of the connecting portions engaging the recesses across a portion of the width of the base.

2. The apparatus according to claim 1, wherein the collapsible frame is attached to the external cover.

3. The apparatus according to claim 1, further comprising one or more handles.

4. The apparatus according to claim 1, wherein the apparatus has a folded state and the unfolded state, wherein, when the apparatus is in the unfolded state, it enables a wheelchair user to securely hold and transport items placed in the inner space.

5. The apparatus according to claim 1, wherein each connecting portion is snap-fit by press fit or friction fit into a respective recess.

6. The apparatus according to claim 1, wherein the external cover containing the collapsible frame is constructed of a fabric with a high friction coefficient.

7. An apparatus for use in personal wheelchairs comprising:

a collapsible frame including:

an open wall; and first and second sides, each of which is attached to a respective end of the open wall, wherein each of the sides is operable to be swiveled partially about the respective one of the ends of the open wall so that the collapsible frame can be placed in a folded or unfolded state, and wherein each of the first side and the second side of the collapsible frame comprises ends formed as hooks, each hook receiving a portion of the open wall therethrough to attach the first side and the second side to the open wall, in an unfolded state, a connecting portion of the first side and a connecting portion of the second side each being disposed within respective recesses formed into a base across an entire width of the base, each of the recesses having a diameter across the entire width of the base relative to a diameter of the connecting portions to releasably secure the connecting portions within the recesses, each of the connecting portions engaging the recesses across a portion of the width of the base;

an external cover on the collapsible frame so as to provide a container-like structure having an inner space, wherein the external cover on the collapsible frame provides an inner space comprising four upwardly extending walls, a bottom and an open top, and wherein a vertical edge of a first upward extending wall contacting a vertical edge of a second upward extending wall forms a corner; and a strap configured to secure the apparatus to a person who is seated, wherein the strap is a belt; and wherein the belt is attached on a first end to a middle of a first corner, thereby extending along a length around a waist of a person, and wherein the belt is attached on a second end to a middle of a second corner.

8. The apparatus of claim 7, wherein the external cover attached to the collapsible frame defines the inner space comprising four upward extending walls, an open top and a bottom wall, and wherein the apparatus further includes handles attached, respectively, to at least one of the upward extending walls.

9. The apparatus of claim 7, further including a base to support the collapsible frame inside the external cover.

10. The apparatus of claim 9, wherein the base includes respective recesses to receive portions of the collapsible frame.

11. The apparatus according to claim 7, wherein each connecting portion is snap-fit by press fit or friction fit into a respective recess.

12. The apparatus according to claim 7, wherein the external cover containing the collapsible frame is constructed of a fabric with a high friction coefficient.

* * * * *